United States Patent
Savard

(10) Patent No.: US 9,292,123 B2
(45) Date of Patent: Mar. 22, 2016

(54) SYSTEM AND METHOD FOR SAMPLE RATE ADAPTION

(71) Applicant: QNX Software Systems Limited, Kanata (CA)

(72) Inventor: Patrick-Andre Savard, Gatineau (CA)

(73) Assignee: 2236008 Ontario, Inc., Waterloo, Ontario (CA)

( * ) Notice: Subject to any disclaimer, the term of this patent is extended or adjusted under 35 U.S.C. 154(b) by 181 days.

(21) Appl. No.: 13/768,095

(22) Filed: Feb. 15, 2013

(65) Prior Publication Data
US 2013/0222302 A1   Aug. 29, 2013

Related U.S. Application Data

(60) Provisional application No. 61/600,194, filed on Feb. 17, 2012.

(51) Int. Cl.
*G06F 3/041*   (2006.01)

(52) U.S. Cl.
CPC ............ *G06F 3/0416* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 6,693,979 | B1 * | 2/2004 | Kumar | 375/326 |
| 2009/0303198 | A1 * | 12/2009 | Yilmaz | H03K 17/9622 345/173 |
| 2010/0053097 | A1 * | 3/2010 | Goh | G06F 3/0416 345/173 |
| 2011/0134076 | A1 | 6/2011 | Kida et al. | |
| 2011/0187677 | A1 | 8/2011 | Hotelling et al. | |
| 2011/0216039 | A1 | 9/2011 | Chen et al. | |
| 2011/0267296 | A1 * | 11/2011 | Noguchi | G06F 3/0412 345/173 |
| 2012/0013546 | A1 * | 1/2012 | Westhues | G06F 3/0418 345/173 |
| 2012/0044180 | A1 * | 2/2012 | Matsui | G06F 3/0418 345/173 |
| 2012/0050217 | A1 * | 3/2012 | Noguchi | G06F 3/0412 345/174 |
| 2012/0075220 | A1 * | 3/2012 | Matsui | G06G 3/044 345/173 |
| 2012/0206399 | A1 * | 8/2012 | Wang | G06F 3/044 345/174 |
| 2012/0223911 | A1 * | 9/2012 | Westhues | G06F 3/0412 345/174 |
| 2012/0293443 | A1 * | 11/2012 | Liu | G06F 3/041 345/174 |
| 2013/0021267 | A1 * | 1/2013 | Lin | G06F 3/0416 345/173 |
| 2013/0027333 | A1 * | 1/2013 | Nagata | G06F 3/044 345/173 |

* cited by examiner

*Primary Examiner* — Seokyun Moon

(74) *Attorney, Agent, or Firm* — Brinks Gilson & Lione

(57) ABSTRACT

A system and method for sample rate adaption. The system and method provide for information derived from sampling at a first rate to be applied or processed at a second rate where the first and second rates differ in frequency and phase. The information is adapted from the first rate to the second rate. Then phase differences including phase introduced as by-product of adapting the frequencies are reduced by phase adaption.

18 Claims, 6 Drawing Sheets

SYSTEM AND METHOD FOR SAMPLE RATE ADAPTION

CROSS-REFERENCE TO RELATED APPLICATIONS

This application claims priority from U.S. Provisional Patent Application Ser. No. 61/600,194, filed Feb. 17, 2012, the entirety of which is incorporated herein by reference.

BACKGROUND OF THE INVENTION

1. Technical Field

The present disclosure relates to the field of sample rate synchronization. In particular, to a system and method for sample rate adaption.

2. Related Art

In a typical touch sensitive device able to render content on a LCD screen, the rendering frequency is locked to the occurrence of the vertical sync ("v-sync"), for example at 60 Hz.

When a user applies a continuous "swipe" across the touch-sensitive device, the finger position is sampled at a frequency that may differ from the v-sync frequency.

The touch panel frequency may vary slightly. Additionally, the "v-sync" signal and the "touch" signal may not be "phase-locked", e.g. the phase delay between a "v-sync" sample and a "touch" sample may vary over time.

In a typical scenario, the touch input drives content to be rendered on the screen. A simple example would be a circle to be drawn to track the finger (touch) location.

Given the characteristics of the signals as explained above, a set of problems arise:

At a given render time, there might be more than one touch sample available, for example when the "touch" signal sampling frequency exceeds the "v-sync" signal frequency.

At a given render time, a given touch sample is stale by the phase difference between the time the rendering starts, and the time the touch sample is taken.

More importantly, the above-mentioned phase difference is not constant.

Perceptually, the lack of consistency in the phase difference results in "jitter" in the content rendered on the screen in response to, for example, a continuous finger "swipe".

BRIEF DESCRIPTION OF DRAWINGS

The system and method may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

A system and method for sample rate adaption. The system and method provide for information derived from sampling at a first rate to be applied or processed at a second rate where the first and second rates differ in frequency and phase. The information is adapted from the first rate to the second frequency. Then phase differences, including phase differences introduced as a by-product of adapting the frequencies, are reduced by phase adaption. The information derived from sampling at the first rate may be multi-dimensional data such as, for example, touch panel sensor data representing Cartesian coordinates of a touch location.

Figure 1:
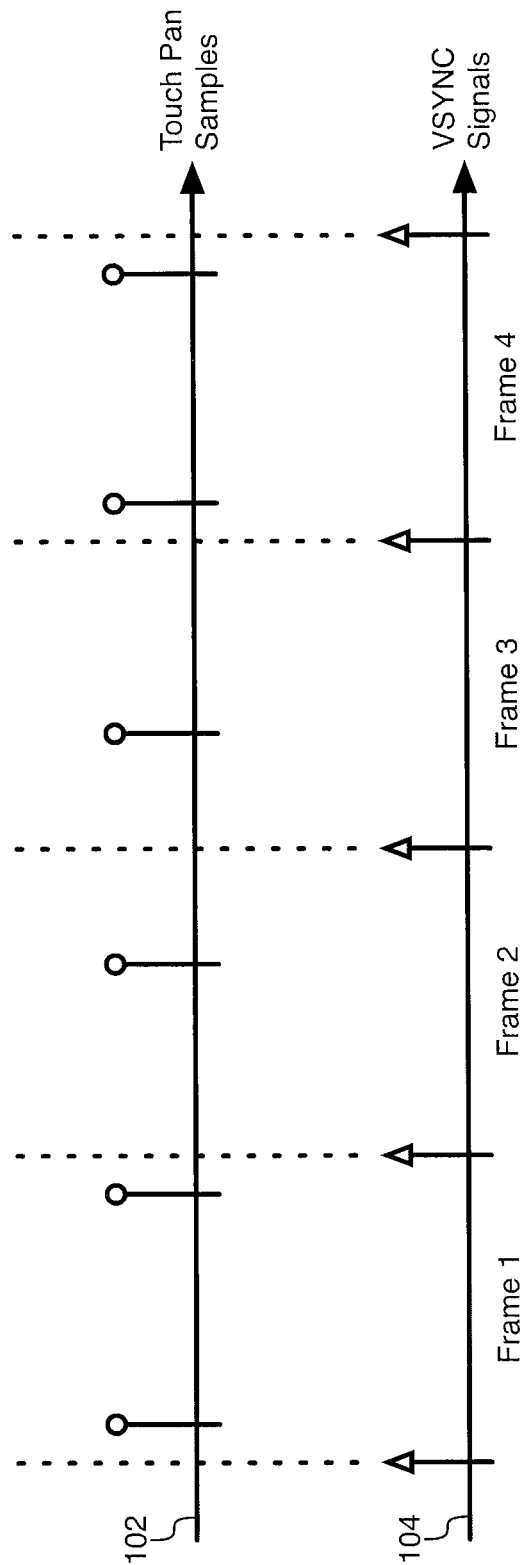
FIG. 1 is a schematic representation of an example timing relationship of touch panel samples and screen refresh (VSYNC) signals having different frequency and phase.

FIG. 1 is a schematic representation of an example timing relationship of touch panel samples 102 and screen refresh (VSYNC) signals 104 having different frequency and phase. In the illustrated example the touch panel sample rate operates at a higher frequency than the screen refresh (VSYNC) rate (a.k.a. the frame rate) and thereby more than one touch panel sample may occur for each VSYNC cycle (e.g. per frame).

The graphic content of each frame to be displayed on the screen is rendered once with each subsequent frame rendered over time at the frame rate (e.g. once per VSYNC cycle). Since the graphic content rendered for each new frame may depend on the position of a touch that was sampled during a preceding frame, having more than one touch panel sample per VSYNC cycle may be problematic. The occurrence of more than one touch panel sample per VSYNC (i.e. screen refresh) cycle is the result of touch panel sampling rate differing from the rate of the screen refresh cycle.

Figure 2:
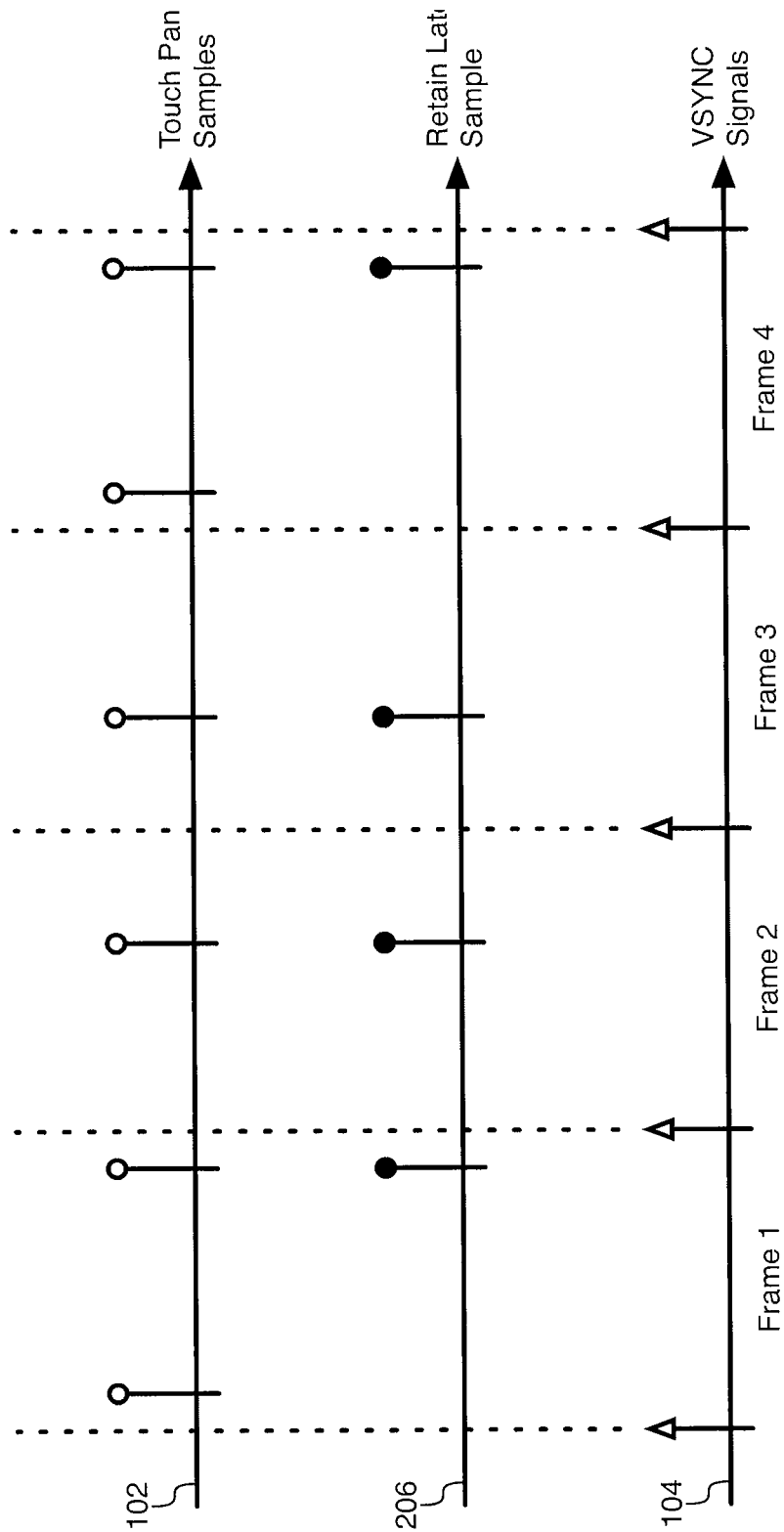
FIG. 2 is a schematic representation of an example timing relationship of touch panel samples, screen refresh (VSYNC) signals and a modified series of touch panel samples where only the most recent touch panel sample per VSYNC cycle is retained.
Figure 3:
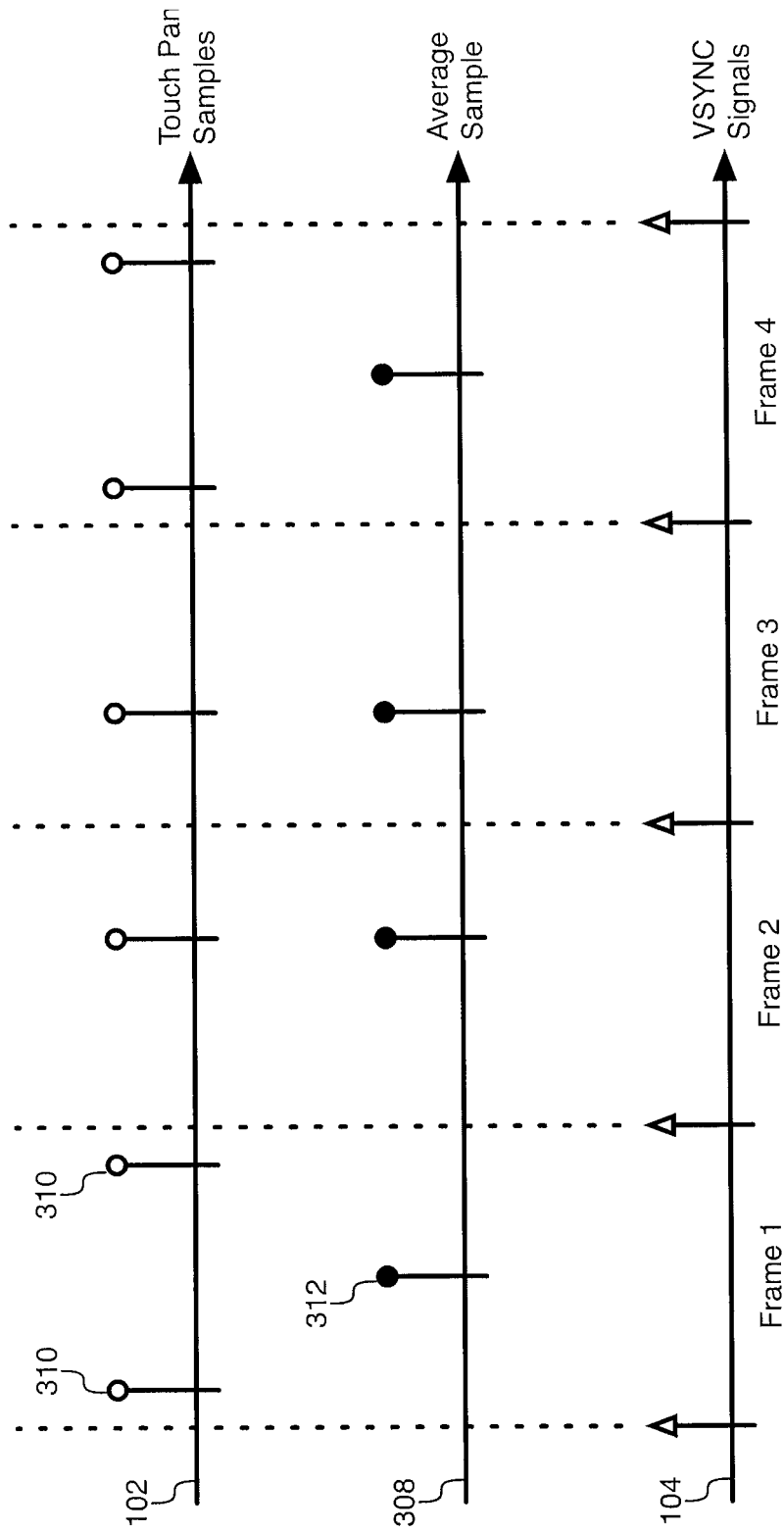
FIG. 3 is a schematic representation of an example timing relationship of touch panel samples, screen refresh (VSYNC) signals and a modified series of touch panel samples where multiple touch panel samples occurring in a single VSYNC cycle are replaced with a single average sample.

Note the in each of FIGS. 1-3 time is depicted as increasing from left to right.

Described below are exemplary techniques for rate adapting the touch-panel sampling rate 102 to the screen refresh (VSYNC) rate 104.

FIG. 2 is a schematic representation of an example timing relationship of touch panel samples 102, screen refresh (VSYNC) signals 104 and a modified series of touch panel samples 206. In the modified series of touch panel samples 206 illustrated, when more than one touch panel sample occurs in the same frame (VSYNC cycle) only the most recent touch panel sample is retained. The older touch panel samples occurring in the same frame are discarded. This approach reduces the staleness of the touch panel samples and thereby minimizes the average phase difference between the modified touch sample rate and the frame refresh (VSYNC) rate. However, this approach may also introduce a higher phase delta from frame to frame resulting in phase jitter.

FIG. 3 is a schematic representation of an example timing relationship of touch panel samples 102, screen refresh (VSYNC) signals 104 and a modified series of touch panel samples 308. In the modified series of touch panel samples 308 illustrated, when more than one touch panel sample occurs in the same frame (VSYNC cycle) the multiple touch panel samples 310 are replaced with a single average sample 312. The averaging of the touch panel samples results in a spatial averaging of the samples and introduces temporal shifts (a.k.a. phase shifts) into the modified series of touch panel samples 308 as both the positions of the original samples and the sampling times are averaged. Averaging of touch panel samples may reduce the phase shift (a.k.a. temporal shift) variance relative to the frame refresh rate (e.g. VSYNC signal).

Figure 4:
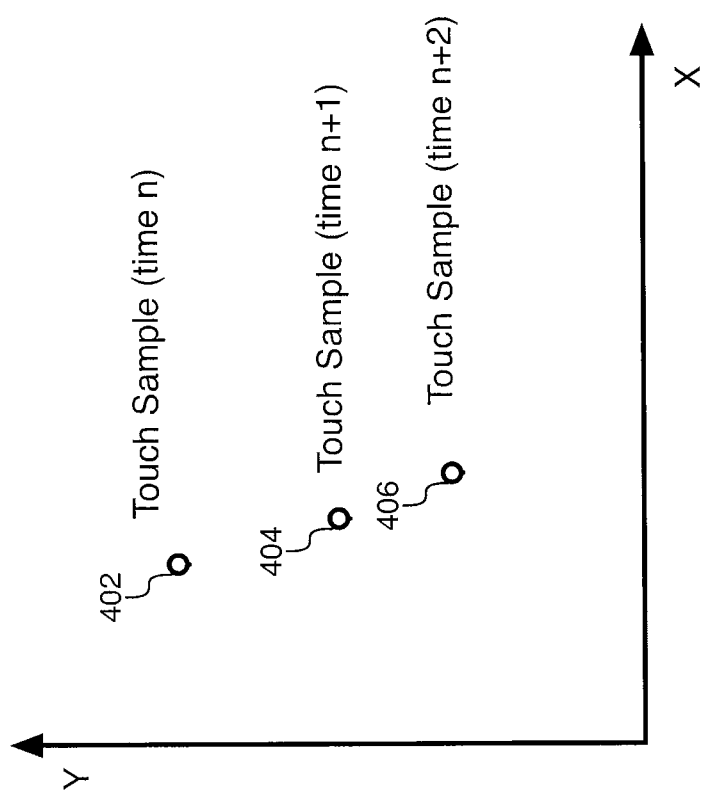
FIG. 4 is a schematic representation of an example series of touch sample locations arranged in two-dimensional space.

FIG. 4 is a schematic representation of an example series of touch sample locations 402, 404 and 406 arranged in a two-dimensional space. Each of the samples at times n, n+1 and n+2 have associated x-axis and y-axis coordinates. When touch panel samples are averaged as described above with reference to FIG. 3, the spatial average is calculated separately for the coordinates in each of the x-axis and the y-axis resulting in a 2-dimensional spatial average in addition to a temporal average.

The system and method or sample rate adaption described herein is also applicable to sample data having other than two dimensions. The sample data may, for example, comprise any of: 1-dimensional data (linear), 2-dimensional data (X,Y), 3-dimensional data (X,Y,Z), velocity, acceleration, and other similar data dimensions. Each sample may generally be n-dimensional.

Each of the approaches described above with reference to FIGS. 2-3 results in a modified series of samples 206 and 308 at substantially the same frequency as the frame (VSYNC) rate but each of the these approaches may also result in a varying phase difference (a.k.a. variance) relative to the phase of the frame (VSYNC) rate that may be referred to as phase noise.

Phase adaption of the modified series of touch panel samples to the frame refresh (VSYNC) signal 104 may be used to mitigate or reduce the phase noise. Phase adaption may be carried out using, for example, a Kalman filter.

The Kalman filter uses a model based on linear dynamics. The un-modeled non-linear properties of the model, also known as the system or process noise, are modeled as white Gaussian noise. The Kalman filter's measurement noise permits modeling of the source of noise in the data. The measurement noise is modeled as temporal phase shift corresponding to the phase difference variance between the modified series of touch samples and the frame refresh rate (e.g. VSYNC signal). The temporal phase shift is modeled as a source of white noise applied to temporal position.

Phase adaption may alternatively be carried out using other mechanisms such as, for example, recursive estimation mechanisms, linear dynamic system models, variants of the Kalman filter and other mechanism adapted to removing noise from signals. Selection of a phase adaption mechanism may be based on parameters such as performance, efficiency (e.g. mitigating processing lag), support for particular noise models, and support for n-dimensional inputs.

Figure 5:
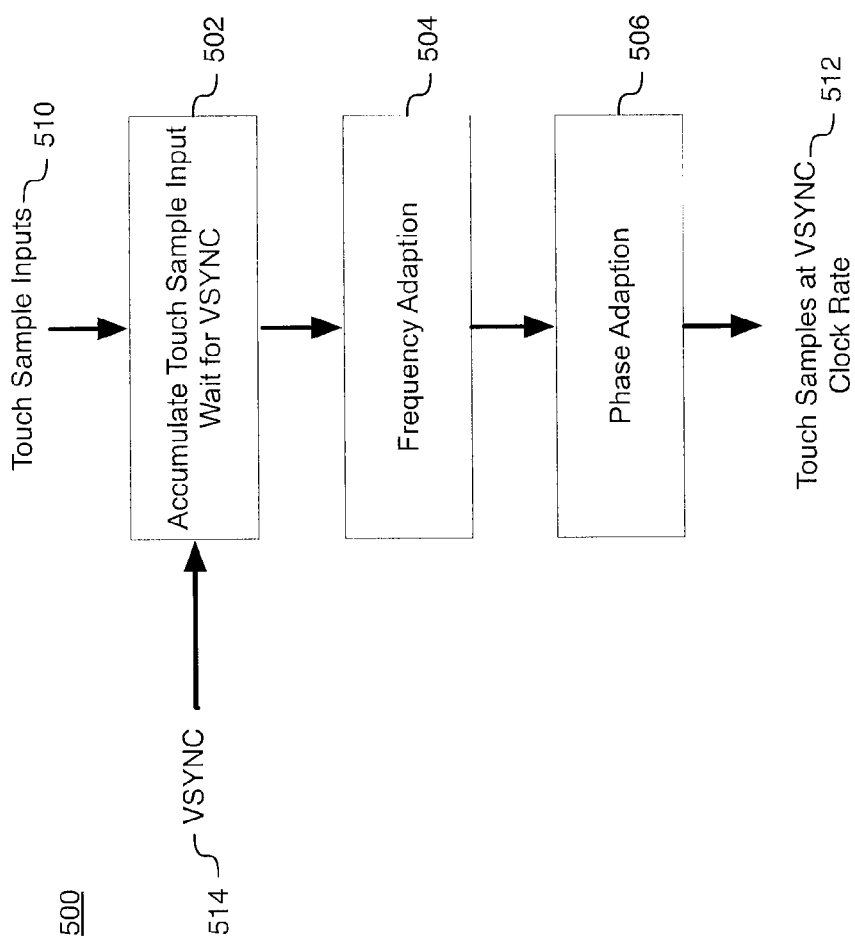
FIG. 5 is a flow diagram representing a method for sample rate adaption.

FIG. 5 is a flow diagram representing a method 500 for sample rate adaption. In a first step 502 one or more touch panel samples 510 may be accumulated for one screen refresh frame (i.e. between VSYNC signals 514). The accumulation of touch panel samples is repeated for each screen refresh frame. In another step 504 the frequency of the touch panel samples may be adapted to the screen refresh (VSYNC) rate. Frequency adaption may be accomplished using, for example, any of the approaches described above with reference to FIGS. 2 and 3 or other non-linear down-sampling techniques. In a further step 506 the phase of the frequency adapted touch panel samples may be adapted. The phase adaption may be accomplished using, for example, a Kalman filter as described above. The method produces a series of touch panel samples 512 having substantially the frequency as the screen refresh (VSYNC) rate and having phase difference that is substantially constant (i.e. having relatively lower variance) relative to the VSYNC signal 514.

Those skilled in the art will recognize that the touch panel samples received in the first step described above with reference of FIG. 5 may already contain some noise before processing according to the system and method for sample rate adaption are applied. This noise may be the result of numerous sources of noise that are generally referred to as sensor noise. The system and method may optionally comprise a sensor noise pre-filter (not illustrated) to reduce or to mitigate the sensor noise. Mechanisms for implementing the sensor noise pre-filter may include, for example, the use of a Kalman filter. The application of a Kalman filter to the sensor noise pre-filter is separate from the application of a Kalman filter to phase adaption described above.

Figure 6:
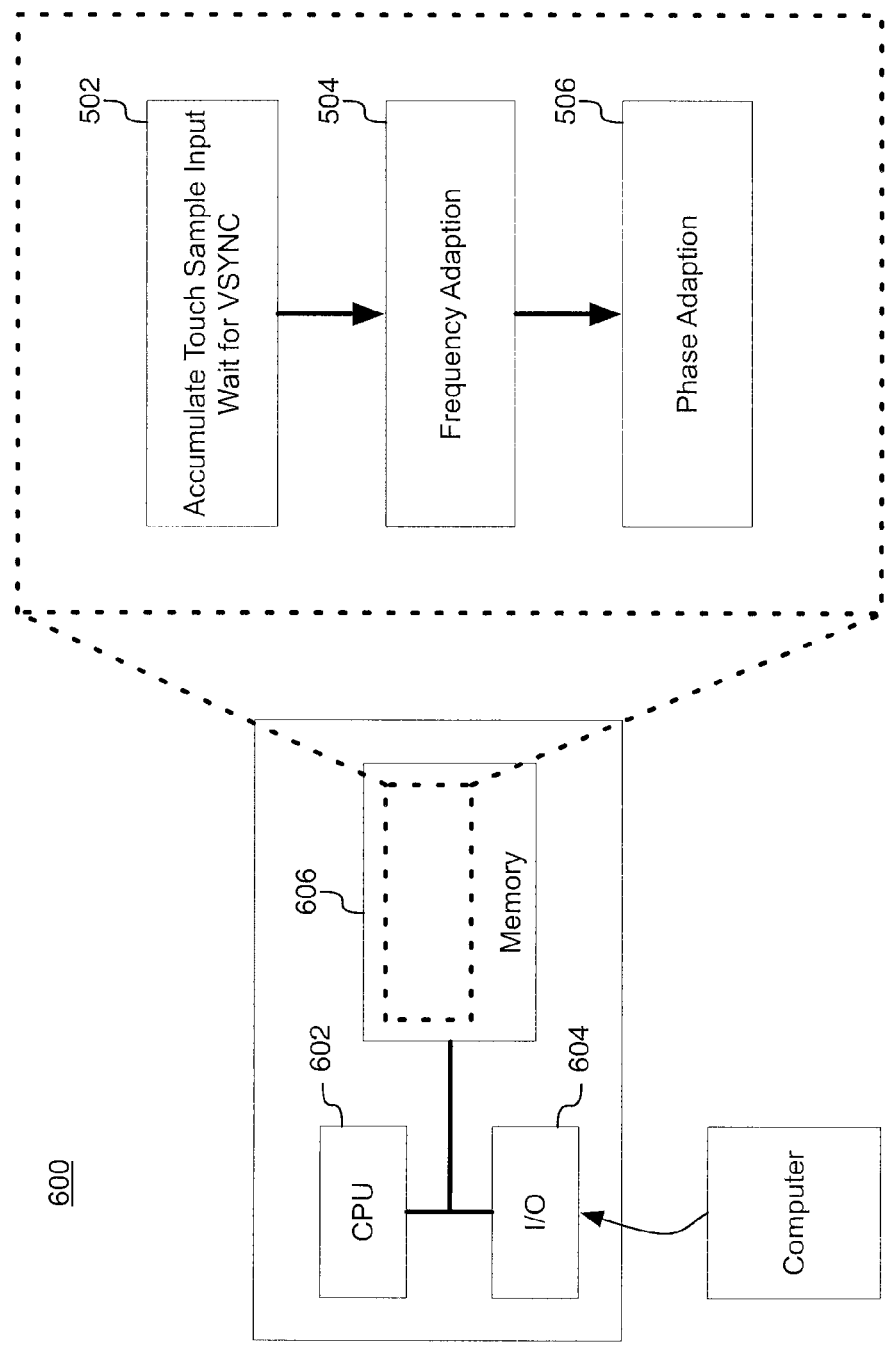
FIG. 6 is a schematic representation of a system for sample rate adaption.

FIG. 6 is a schematic representation of a system for sample rate adaption. The system 600 comprises a processor (aka CPU) 602, input and output interfaces (aka I/O) 604 and memory 606. The memory 606 may store instructions that, when executed by the processor 602, configure the system 600 to enact the system and method for sample rate adaption described herein including sample accumulation 502, frequency adaption 504 and phase adaption 506.

Although illustrated herein in the context of a touch panel sensor sampling rate and a screen refresh rate, the system 600 and method 500 for sample rate adaption described herein can be applied in other applications where information derived from sampling at a first rate is applied or processed at a second rate where the first and second rates differ in frequency and phase.

While various embodiments of the system and method have been described, it will be apparent to those of ordinary skill in the art that many more embodiments and implementations are possible within the scope of the present disclosure. Accordingly, the system and method not to be restricted except in light of the attached claims and their equivalents.

The invention claimed is:

1. A method for sample rate adaption comprising:
   accumulating for each of a series of cycles at an output sample rate, a plurality of input samples sampled at an input sample rate that are received during a period of a screen refresh signal operated at a screen refresh rate, where the output sample rate is substantially the screen refresh rate and is less than the input sample rate, and where the series of cycles includes consecutive or non-consecutive cycles;
   adapting the input sample rate to the output sample rate by replacing the input samples received during each cycle with a single representative sample; and
   adapting the phase of a series of the single representative samples to the phase of the screen refresh signal by reducing phase noise in the series of the single representative samples.

2. The method for sample rate adaption of claim 1, where the output sample rate is the screen refresh rate; where the one or more input samples include touch panel samples; and where the input sample rate is a touch panel sample rate.

3. The method for sample rate adaption of claim 2 where each of the input samples represents coordinates of a touch location.

4. The method for sample rate adaption of claim 1, where each of the inputs samples is a multi-dimensional sample.

5. The method for sample rate adaption of claim 1, where the single representative sample is a most recent sample of the input samples received during each cycle.

6. The method for sample rate adaption of claim 1, where the single representative sample is an average of the input samples received during each cycle.

7. The method for sample rate adaption of claim 1, where adapting the phase of a series of the single representative samples to the phase of the screen refresh signal operated at the screen refresh rate includes the use of a Kalman filter.

8. The method for sample rate adaption of claim 1, where adapting the phase of a series of the single representative samples to the phase of the screen refresh signal operated at the screen refresh rate includes the use of any of: recursive estimation mechanisms, linear dynamic system models, and variants of a Kalman filter.

9. The method for sample rate adaption of claim 1, further comprising pre-filtering sensor noise before accumulating the one or more input samples.

10. A system for sample rate adaption, comprising:
    an accumulator to accumulate for each of a series of cycles at a output sample rate, input samples sampled at an input sample rate that are received during a period of a screen refresh signal operated at a screen refresh rate, where the output sample rate is substantially the screen refresh rate and is less than the input sample rate, and where the series of cycles includes consecutive or non-consecutive cycles;
    a frequency adaptor to adapt the input sample rate to the output sample rate by replacing the input samples received during each cycle with a single representative sample; and
    a phase adapter to adapt the phase of a series of the single representative samples to the phase of the screen refresh signal by reducing phase noise in the series of the single representative samples.

11. The system for sample rate adaption of claim 10,
    where the output sample rate is the screen refresh rate;
    where the input samples include one or more touch panel samples; and
    where the input sample rate is a touch panel sample rate.

12. The system for sample rate adaption of claim 11, where each of the input samples represents coordinates of a touch location.

13. The system for sample rate adaption of claim 10, where each of the inputs samples is a multi-dimensional sample.

14. The system for sample rate adaption of claim 10, where the single representative sample is a most recent sample of the input samples received during each cycle.

15. The system for sample rate adaption of claim 10, where the single representative sample is an average of the input samples received during each cycle.

16. The system for sample rate adaption of claim 10, where the phase adapter to adapt the phase of a series of the single representative samples to the phase of the screen refresh signal operated at the screen refresh rate includes a Kalman filter.

17. The system for sample rate adaption of claim 10, where the phase adapter to adapt the phase of a series of the single representative samples to the phase of the screen refresh signal operated at the screen refresh rate includes of any of: recursive estimation mechanisms, linear dynamic system models, and variants of a Kalman filter.

18. The system for sample rate adaption of claim 10, further comprising a pre-filter to pre-filter sensor noise.

\* \* \* \* \*

UNITED STATES PATENT AND TRADEMARK OFFICE
CERTIFICATE OF CORRECTION

| | | |
|---|---|---|
| PATENT NO. | : 9,292,123 B2 | Page 1 of 1 |
| APPLICATION NO. | : 13/768095 | |
| DATED | : March 22, 2016 | |
| INVENTOR(S) | : Patrick-Andre Savard | |

It is certified that error appears in the above-identified patent and that said Letters Patent is hereby corrected as shown below:

In the Claims

Column 4, line 54, delete "one or more".

Column 5, line 13, delete "one or more".

Column 6, line 3, delete "one or more".

Signed and Sealed this
Thirty-first Day of May, 2016

Michelle K. Lee
*Director of the United States Patent and Trademark Office*